United States Patent
Powell et al.

(10) Patent No.: US 12,348,544 B1
(45) Date of Patent: Jul. 1, 2025

(54) LINEARIZED REAL-TIME NETWORK INTRUSION DETECTION SYSTEM

(71) Applicant: The United States of America as represented by the Secretary of the Navy, Newport, RI (US)

(72) Inventors: Makia S Powell, North Dighton, MA (US); Benjamin M Drozdenko, Newport, RI (US); Steven A Roodbeen, Seekonk, MA (US)

(73) Assignee: The United States of America as represented by the Secretary of the Navy

( * ) Notice: Subject to any disclaimer, the term of this patent is extended or adjusted under 35 U.S.C. 154(b) by 257 days.

(21) Appl. No.: 18/121,716

(22) Filed: Mar. 15, 2023

Related U.S. Application Data

(63) Continuation-in-part of application No. 17/900,982, filed on Sep. 1, 2022, now Pat. No. 12,143,406.

(51) Int. Cl.
*H04L 9/40* (2022.01)
*G06N 20/00* (2019.01)

(52) U.S. Cl.
CPC ......... *H04L 63/1425* (2013.01); *G06N 20/00* (2019.01)

(58) Field of Classification Search
CPC .................. H04L 63/1425; G06N 20/00
See application file for complete search history.

(56) References Cited

U.S. PATENT DOCUMENTS

| | | | |
|---|---|---|---|
| 2018/0316707 A1* | 11/2018 | Dodson | H04L 43/20 |
| 2019/0188065 A1* | 6/2019 | Anghel | G06F 11/0778 |
| 2019/0368316 A1* | 12/2019 | Bize-Forest | G06Q 10/06 |
| 2020/0211325 A1* | 7/2020 | Kaizerman | G06F 16/2477 |
| 2020/0382536 A1* | 12/2020 | Dherange | H04L 63/1425 |
| 2021/0103829 A1* | 4/2021 | Barshan | G06N 20/10 |
| 2022/0019863 A1* | 1/2022 | Iskandar | G06N 3/08 |
| 2022/0147815 A1* | 5/2022 | Conwell | G06N 3/045 |

(Continued)

OTHER PUBLICATIONS

Nour Moustafa, Jill Slay, UNSW-NB15: A Comprehensive Data set for Network Intrusion Detection Systems, paper, University of New South Wales at the Australian Defence Force Academy, Canberra Australia.

*Primary Examiner* — Jimmy H Tran
(74) *Attorney, Agent, or Firm* — James M. Kasischke; Jeffry C. Severson

(57) ABSTRACT

A method for detecting a cyberattack on a network being monitored includes providing a labeled packet capture data training set. Metrics are identified that are indicative of either cyberattack data or normal data. Statistical measures are computed based on the identified metrics. A determination is made if linearization in necessary based on the statistical measures. If necessary the identified metrics are linearized. A machine learning network is then trained on the linearized training data to classify packet capture data as either cyberattack data or normal data. Real packet capture data is intercepted from the network being monitored, and real metrics from the intercepted data is linearized. The trained machine learning network is utilized to identify normal data and cyberattack data from the real data. A user is alerted if the trained machine learning network identifies cyberattack data in the linearized real data.

15 Claims, 3 Drawing Sheets

(56) References Cited

U.S. PATENT DOCUMENTS

| | | | |
|---|---|---|---|
| 2023/0123045 A1* | 4/2023 | Kim | G06N 20/10 |
| | | | 707/740 |
| 2023/0368054 A1* | 11/2023 | Nikolic | G06N 3/084 |
| 2024/0031378 A1* | 1/2024 | Mendelowitz | G06N 5/01 |
| 2024/0036963 A1* | 2/2024 | Azeez | G06N 20/00 |

* cited by examiner

LINEARIZED REAL-TIME NETWORK INTRUSION DETECTION SYSTEM

CROSS REFERENCE TO OTHER PATENT APPLICATIONS

This is a continuation in part of U.S. Patent Application Ser. No. 17,900,982.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention is directed to a method for detecting an intrusion in a packet switched network in real time.

(2) Description of the Related Art

The need for cybersecurity has increased recently with the both the increase of society's reliance upon computer equipment and increase of cyberattacks on commercial systems, governmental systems and the infrastructure. However, the amount of cybersecurity data available on systems easily leads to operator overload, reducing the effectiveness of standard cybersecurity systems. To aid cybersecurity operators, there is a need to merge machine learning with the correct features/variables to make better decisions and/or aid them in maintaining networks and systems. (Bresnicker, K., Gavrilovska, A., Holt, J., Milojicic, D., & Tran, T. (2019). Grand Challenge: Applying Artificial Intelligence and Machine Learning to Cybersecurity. Computer, 45-52). A lack of cybersecurity can put the data contained on the systems in danger and disrupt operations as adversaries gain access to critical information and systems Rose et al., NIST SP 800-207, "Zero Trust Architecture").

The consequences of a lack of cybersecurity can be seen in recent events. Relevant examples of the need for cybersecurity are the recent cyberattacks against the United infrastructure in the form of the attack against a gas pipeline in the southeast United States, Colonial Pipeline, which disrupted the gas supply. Benner et al., New York Times, "U.S. Seizes Share of Ransom From Hackers in Colonial Pipeline Attack", (Jun. 7, 2021).), and an attack on a beef processor, JBS, which threatened beef availability Batista et al., Bloomberg News, "All of JBS's U.S. Beef Plants Were Forced Shut by Cyberattack", (May 31, 2021).).

These attacks could have been prevented via a relatively new approach known as zero trust architecture, combined with machine learning cybersecurity. There are many other systems which can benefit from this integrated approach. Machine learning cybersecurity is a combination of data science and machine learning which analyzes network and system data, which may be terabytes per day, recognizes anomalies using machine learning algorithms and then acts based upon the data. The common sources of information include logs, network traffic headers, network packet information, and data length. By sorting through terabytes of data, the alerts generated can either result in the network automatically taking steps to secure itself, such as shutting down traffic between routers, or alerting an administrator to act (Rose.). This is often part of a zero trust architecture whose main tenet is to not inherently trust any network, resource, or user but instead verify the identity of each actor each time a resource is requested (Id.). Zero trust assumes that a network has already been infiltrated and thus takes preemptive steps to protect data. This prevents not only initial attacks but reduces lateral movement of an adversary once they gain access to a network (Id.). Although zero trust and machine learning cybersecurity work well together to secure systems and data, there is still a need to determine what data is needed from the system and networks and a standardized approach to both gather data and train machine learning cybersecurity systems (Bresnicker.). These data needs are the primary focus of this research.

Increased cybersecurity is difficult because many attacks exploit newly discovered vulnerabilities and originate from new sources. Current intrusion detection methods require the cybersecurity operator to sift through gigabytes or terabytes of network traffic. This is infeasible with current technologies because these methods require on recognizing a known attack method or signature.

Machine learning has been used for identifying these zero-day attacks. Existing machine learning methods often require many features, which makes real time processing impractical. Reduction of the number of features is expected to reduce detection to around 50% which is unacceptably low. Machine learning and artificial intelligence methods have emerged which are able to detect and identify new attack traffic, however many need additional tools such as Zeek/Bro IDS to sift through and process the traffic, negating availability as a real-time system. For example, some prior art research requires analysis of 39 features, but raw, real-time network packet capture data commonly only provides 5 features. (Moustafa, N., & Slay, J. (2015). UNSW-NB15: a comprehensive data set for network intrusion detection systems (UNSW-NB15 network data set). 2015 Military Communications and Information Systems Conference (MilCIS), 1-6. doi: 10.1109/MilCIS.2015.7348942).

SUMMARY OF THE INVENTION

The first object of the present invention is to provide a method for identifying a cyberattack in real time.

Another object is to identify the particular type of cyberattack in real time.

Accordingly, there is provided a method for detecting a cyberattack on a network being monitored includes providing a labeled packet capture data training set. Metrics are identified that are indicative of either cyberattack data or normal data. Statistical measures are computed based on the identified metrics. A determination is made if linearization in necessary based on the statistical measures. If necessary the identified metrics are linearized. A machine learning network is then trained on the linearized training data to classify packet capture data as either cyberattack data or normal data. Real packet capture data is intercepted from the network being monitored, and real metrics from the intercepted data is linearized. The trained machine learning network is utilized to identify normal data and cyberattack data from the real data. A user is alerted if the trained machine learning network identifies cyberattack data in the linearized real data.

In another embodiment, multiple machine learning networks are trained on linearized normal data and cyberattack data associated with a particular cyberattack. Linearized real data is provided simultaneously to the multiple trained networks. Output from the networks is analyzed to determine if a cyberattack has occurred and the particular cyberattack. Users are alerted. Optionally, the network being monitored can take preprogrammed responses associated with the particular cyberattack.

BRIEF DESCRIPTION OF THE DRAWINGS

Reference is made to the accompanying drawings in which are shown an illustrative embodiment of the invention, wherein corresponding reference characters indicate corresponding parts, and wherein.

DETAILED DESCRIPTION OF THE INVENTION

Figure 1:
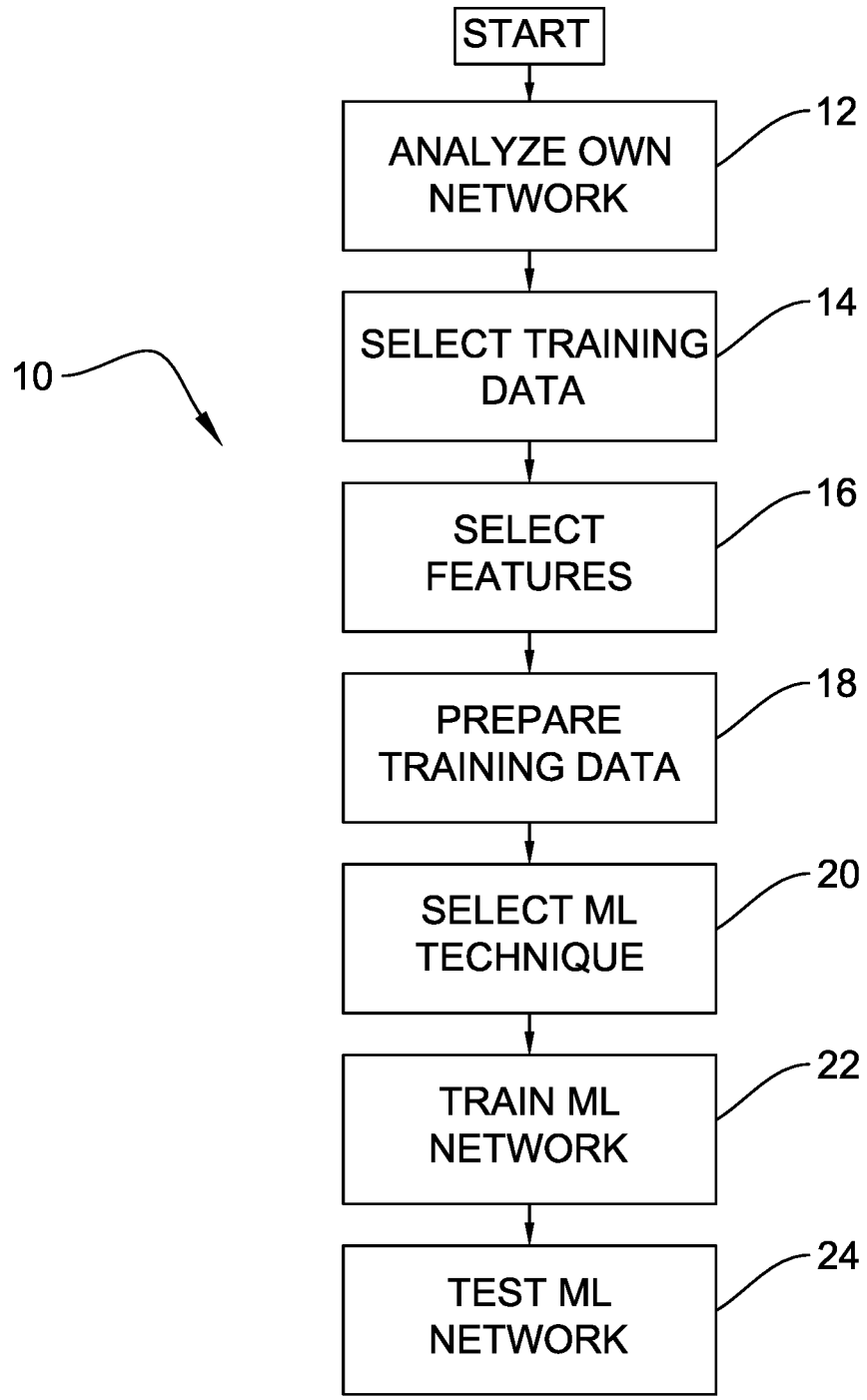
FIG. 1 is a diagram of a machine learning training process.

FIG. 1 shows a flowchart 10 for preparing and training the machine learning portion of the system. In step 12 the user analyzes its own TCP/IP network to determine metrics related to the packets on the network. The data captured is referenced as packet capture (PCAP) data which is a set of network metrics. PCAP data is observed utilizing a network analyzer. Software such as Zeek, Netflow, sFlow or the like can be utilized to capture these metrics. Some of the available metrics are destination bits per second; source to destination packet count; destination to source packet count; source TCP window advertisement value; destination TCP advertisement value; source TCP base sequence number; destination TCP base sequence number; mean packet size transmitted by source; mean packet size transmitted by the destination; pipelined depth into connection of the http transaction; actual uncompressed content size of the data transferred; source jitter; destination jitter; record start time; record last time; source interpacket arrival time; destination interpacket arrival time; TCP connection setup roundtrip time; and others. The own network analysis should include statistical measures of these metrics such as mean, median and mode.

In step 14, a training data set is selected or developed has non-attack data that conforms with the statistical measures developed in step 12. Various training data sets are available to cybersecurity researchers. These data sets are PCAP data that includes labeled non-attack data and labeled attack data. Cybersecurity attack data may also include a label for the type of cybersecurity attack. In the alternative, it is known to develop training data by collecting baseline data concerning one's own network as labeled non-attack data and then subjecting the network to attack with hacking tools. The data collected during the mock attack can be labeled as attack data. As yet another alternative, baseline data can be collected concerning one's own network and labeled as non-attack data. This can be combined with labeled attack data from an outside cybersecurity data set. In any case, the non-attack data should have statistical measures that are similar within a statistical tolerance to those collected in the own network analysis step 12.

In step 16, features for analysis are selected from the list of metrics available from the network analyzer software. Differences between the mode, median, and mean of the attack data features and the non-attack data features can provide an indicator that the data is attack data. Mode can be used to provide an expected value. (This is especially useful when the feature is non-numeric.) Median can be used for establishing thresholds at the median value plus a percentage threshold and the median value minus a percentage threshold. The mean predicts the average value. A high standard deviation associated with the mean may indicate that the metric should not be used for analysis. With these, the standard deviation gives uniformity of the data.

In order to select features, metrics for available features were compared using a training data set with labeled attack data and non-attack data. Large differences between the mean values for attack data when compared to non-attack data suggests usefulness of those feature means. In one case it was found that the source byte means, the destination byte means, and the mean number of packets differed significantly between the attack data and the non-attack data. The source byte mean for attack data was found to be 100% higher than that for the non-attack data. The mean of the destination bytes feature for attack data is nearly twice the mean of the destination bytes feature for non-attack data. The mean number of source packets in the non-attack data is 30% lower than the mean number of source packets in the attack data. In destination packets, the mean for attack data is over twice the mean for non-attack data. In this case, the source byte feature, the destination byte feature, and the destination packet feature were selected as features for training because these feature means were significantly different between the attack data and the non-attack data. This suggests a low P-value or a low likelihood that the differences occur by chance given the distribution of data. The University of New South Wales (USNSW) network data set, cited above, has a non-normal skewed distribution. Methods tolerant of non-normally distributed data were used, and the P-value conclusions are true.

These three features (source bytes, destination bytes, and state) stood out from the other features as both independent and having the most statistically significant expected values in statistical analysis. Independence is necessary to use the features in machine learning algorithms since adding the data is expected to result in higher accuracy. The statistical significance makes it more likely that the machine learning algorithms will be able to differentiate the data labels, leading to higher accuracy. In other networks, different features and a different number of features may be independent and statistically significant. The features can be selected by setting a top number of features or by the number of features having high statistical significance.

While source packets showed a difference, the difference was not as significant as for these three features.

State was also analyzed as a feature because it is readily available and independent. State is the packet state. State depends on transaction protocol and has 16 values (ACC, CLO, CON, ECO, ECR, FIN, INT, MAS, PAR, REQ, RST, TST, TXD, URH, URN and '-' if not applicable). These were encoded as integers for compatibility with machine learning algorithms. Mode is useful for this analysis because if the states are given numeric values, each state represents a different class. Means and medians are meaningless. The mode of the state differed between attack data and non-attack data. In one example, the mode of non-attack traffic is "FIN", and the mode of attack traffic is "INT." As a difference, this is a feature that can be utilized to train the machine learning algorithm.

Another criteria for selection of features is whether the features are independent and readily obtainable for packet capture data. Source bytes and destination bytes are readily available from packet capture data. Source packet number and destination packet number are not readily available and would need to be computed. These features should not be included unless they significantly improve attack detection.

Analysis should be performed to determine if the features are independent. Concerning source packet number and destination packet number, these features were compared with the source byte mean and the destination byte mean. A definite correlation was found between source byte mean and source packet number and also between destination byte mean and destination packet number. In view of this, source packet number and destination packet number features do not need to be considered because these features are not independent.

In step 18, the training data is prepared by extracting the selected features and the class. Testing and analysis found that the method can be improved by utilizing the raw number of source bytes and the raw number of destination bytes. Use of the "class" field is not necessary. Statistical analysis found that source bytes and destination bytes had a non-Gaussian distribution, was very leptokurtic and right skewed. Furthermore, attacks such as distributed denial of service (DDOS) resulted in outlier peaks.

Linearization is performed to normalize the data and remove the outliers. Linearization involves computing the logarithm of the source byte count (sbytes) and the logarithm of the destination byte count (dbytes). For example:

$$A = \text{Log}(\text{sbytes} + 1 \times 10^{-10}) \quad (1)$$

$$B = \text{Log}(\text{dbytes} + 1 \times 10^{-10}) \quad (2)$$

$1 \times 10^{-10}$ is added a correction factor to allow computation of the logarithm when source bytes and destination bytes are zero. In this case, the logarithm of $1 \times 10^{-10}$ will allow training data influence when features are computed utilizing A or B; however, this value will not influence the data in non-zero ranges. ($1 \times 10^{-10}$ is used as a correction factor because it is higher than machine epsilon for 64-bit numbers.) Computation of logarithms reduces the variability of the data and makes it more suitable for machine learning algorithms.

Multiple transformations were applied to the logarithm of the source byte count and the logarithm of the destination byte count to generate multiple variables as follows:

Variable 1: A (3)
Variable 2: B (4)
Variable 3: A+B (5)
Variable 4: A−B (6)
Variable 5: A*B (7)
Variable 6: A/B (8)

These variables are identified with the appropriate label and then utilized as training data for training the machine learning technique.

A supervised machine learning technique is selected in step 20 for classifying input data as either attack data or normal data. Supervised machine learning algorithms include neural network with two hidden layers, k-means clustering, Gaussian mixture clustering, random forest, extra trees, gradient boosting, histogram gradient boosting, voting classifier with random forest and logistic regression, bagging, Adaboost, and stacking classifier with random forest and logistic regression. In step 22, these machine learning techniques were trained utilizing the prepared training data.

After training, the trained network was tested with unmarked data in step 24. During testing, it was found that tree-based machine learning algorithms were most effective. These algorithms include random forest, extra trees, gradient boosting, histogram gradient boosting, voting classifier with random forest and logistic regression, bagging, Adaboost, and stacking classifier with random forest and logistic regression. Less accurate techniques include neural network with two hidden layers, and k-means clustering. Generally, these tree-based algorithms performed on non-linearized data with an accuracy of 90% in distinguishing attack traffic from normal traffic. They also had a 97% accuracy in identifying specific cyberattacks.

The linearized source bytes and destination bytes data was trained on and tested against a KDDCUP99 a public marked dataset available from the Defense Advanced Research Project Agency (DARPA). This testing resulted in 98% accuracy in predicting cyberattacks with a low false positive rate.

Figure 2:
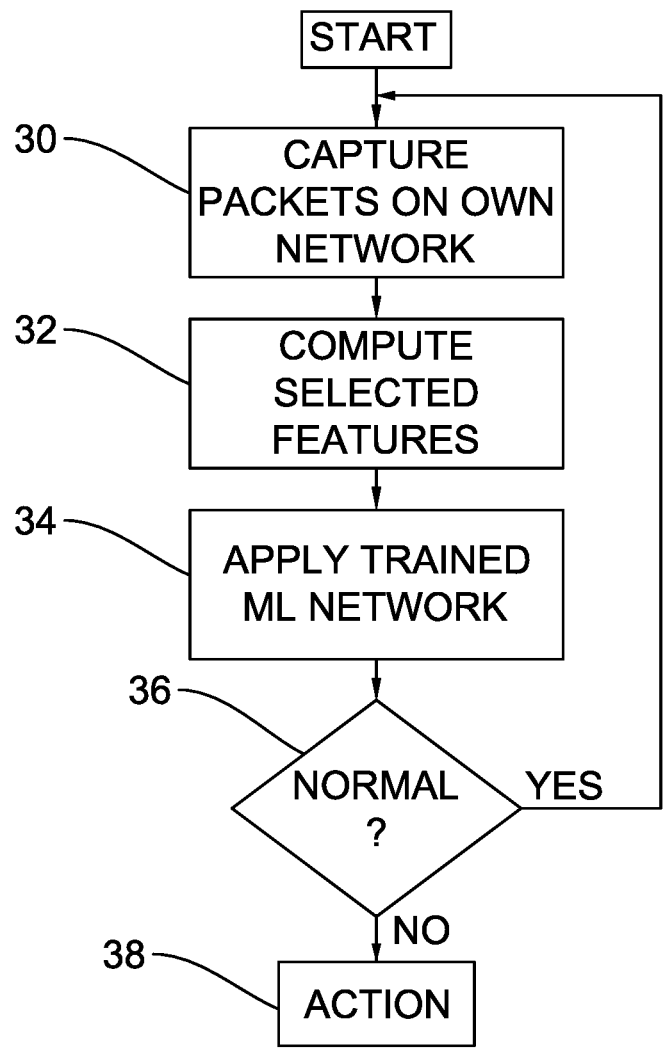
FIG. 2 is a diagram for utilizing the trained machine learning network to detect network intrusions.

FIG. 2 shows a first embodiment of classifying attack data and normal data utilizing the trained machine learning network prepared as described with reference to FIG. 1. Raw data packets are captured from the network being analyzed in step 30. In step 32, the features selected in step 16 are computed and extracted from the captured packets. In step 34, these features are applied to the trained machine learning network prepared in step 22. The trained machine learning algorithm classifies the data as normal or as attack data. In step 36, data processing continues if the captured packets are normal and monitoring continues in step 30. When the packets are identified as attack data, the user is alerted in step 38.

Figure 3:
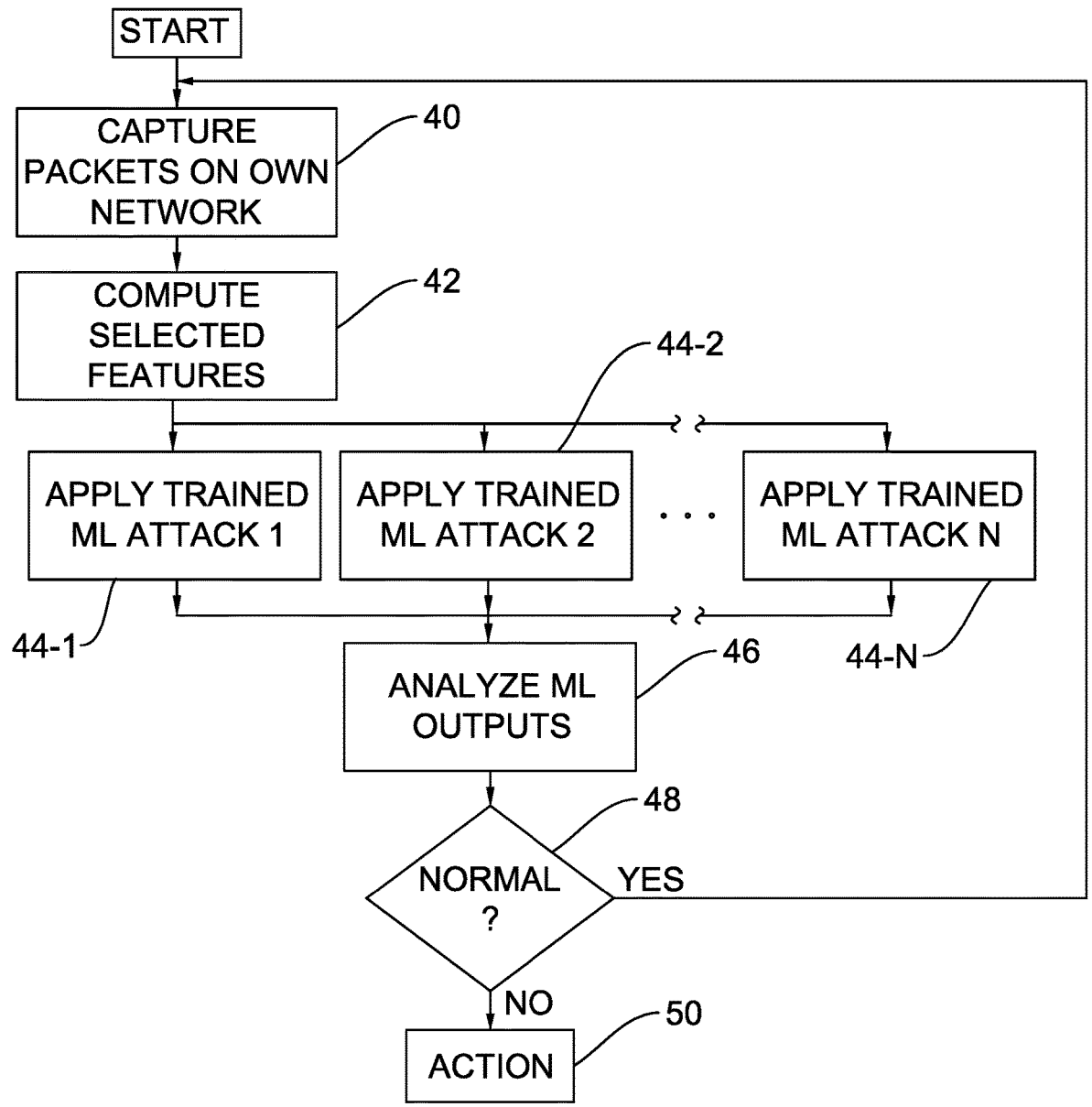
FIG. 3 is a diagram for utilizing a plurality of trained machine learning networks to detect network intrusions.

FIG. 3 shows a second embodiment that allows for classifying the type of attack. Utilizing the procedures of FIG. 1, several machine learning networks are each trained on normal data and on specific cyberattacks. This is performed by preparing cyberattack data associated with the particular cyberattack and using that as the cyberattack data. Different cyberattacks can have different selected features, and each machine learning network can be trained using its own set of selected features. The method described in FIG. 1 then provides a machine learning network trained to identify one particular cyberattack.

In FIG. 3, data packets are captured from the network in step 40. All selected features required for identifying any trained cyberattack are computed in step 42. The computed features are provided to the plurality of trained machine learning networks 44-1, 44-2 through 44-N. Each of these networks 44-1-N determines whether the submitted features evidences the associated type of cyberattack. Machine learning network output is received at analysis routine 46. Analysis routine 46 determines if any of the networks 44-1-N show a cyberattack. Routine 46 further indicates which kind of cyberattack has been identified. If no cyberattack is shown, decision block 48 continues processing with step 40. If cyberattacks are shown, step 50 is executed for action. Action may include a suggested response with the identified cyberattack.

It will be understood that many additional changes in the details, materials, steps, and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive, nor to limit the invention to the precise form disclosed, and obviously, many modification and variations are possible in light of the above teaching. Such modifications and variations that may be apparent to a person skilled in the art are intended to be included within the scope of this invention as defined by the accompanying claims.

What is claimed is:

1. A method for detecting a cyberattack on a network being monitored comprising the steps of:
   providing a training set of packet capture data with each data element labeled as cyberattack data or as normal data, each data element further having a plurality of metrics associated therewith;
   identifying metrics associated with packet capture data elements that are indicative of either cyberattack data or normal data;
   computing statistical measures based on the identified metrics in the training set of packet capture data that relate to either cyberattack data or normal data wherein computing statistical measures comprises computing a distribution of the identified metrics;
   determining if linearization is necessary based on the computed statistical measures wherein determining if linearization is necessary comprises determining if the computed distribution is Gaussian and determining that linearization is necessary if the computed distribution is not Gaussian;
   linearizing the identified metrics in the training set of packet capture data to obtain linearized training data;
   training a machine learning network utilizing the linearized training data to classify packet capture data as either cyberattack data or normal data;
   intercepting real packet capture data from the network being monitored, said intercepted real packet capture data having real metrics for the same parameters as the identified metrics;
   linearizing the real metrics from the intercepted real packet capture data to obtain linearized real data;
   utilizing the trained machine learning network to identify normal data and cyberattack data from the linearized real data; and
   alerting a user if the trained machine learning network identifies cyberattack data in the linearized real data.

2. The method of claim 1, wherein the machine learning network is a tree-based machine learning network.

3. The method of claim 2, wherein the tree-based machine learning network is a random forest tree-based machine learning network.

4. The method of claim 2, wherein the tree-based machine learning network is an extra trees based machine learning network.

5. The method of claim 1, wherein the provided training set is selected to have selected metrics that have computed statistical measures for normal data that are similar within a statistical tolerance to real packet capture data from the network being monitored.

6. The method of claim 1, wherein the provided training set is created from real packet capture data labeled as normal data and added cyberattack data labeled as cyberattack data.

7. A method for detecting a cyberattack on a network being monitored comprising the steps of:
   providing a training set of packet capture data with each data element labeled as cyberattack data or as normal data, each data element further having a plurality of metrics associated therewith;
   identifying metrics associated with packet capture data elements that are indicative of either cyberattack data or normal data;
   computing statistical measures based on the identified metrics in the training set of packet capture data that relate to either cyberattack data or normal data;
   determining if linearization in necessary based on the computed statistical measures;
   linearizing the identified metrics in the training set of packet capture data to obtain linearized training data;
   training a machine learning network utilizing the linearized training data to classify packet capture data as either cyberattack data or normal data;
   intercepting real packet capture data from the network being monitored, said intercepted real packet capture data having real metrics for the same parameters as the identified metrics;
   linearizing the real metrics from the intercepted real packet capture data to obtain linearized real data;
   utilizing the trained machine learning network to identify normal data and cyberattack data from the linearized real data; and
   alerting a user if the trained machine learning network identifies cyberattack data in the linearized real data;
   wherein:
   linearizing the identified metrics comprises taking a logarithm of the identified metrics to produce an identified metric logarithm for each identified metric; and
   linearizing the real metrics comprises taking a logarithm of the real metrics to produce a real metric logarithm for each real metric.

8. The method of claim 7 wherein a correction factor is added to the identified metric and to the real metric before taking the logarithm.

9. The method of claim 8 wherein:
   identifying metrics identifies only two metrics;
   linearizing the identified metrics further comprises computing a sum of the identified metric logarithms, computing a difference between the identified metric logarithms, computing a multiplication between the identified metric logarithms, and computing a division between the identified metric logarithms;
   training a machine learning network comprises utilizing the identified metrics, the computed sum, the computed difference, the computed multiplication, and the computed division as linearized training data;
   linearizing the real metrics further comprises computing a real sum of the real metric logarithms, computing a real difference between the real metric logarithms, computing a real multiplication between the real metric logarithms, and computing a real division between the real metric logarithms; and
   utilizing the trained machine learning network comprises utilizing the real metrics, the computed real sum, the computed real difference, the computed real multiplication, and the computed real division as linearized real data.

10. A method for detecting and identifying a cyberattack on a network being monitored comprising the steps of:
    providing a training set of packet capture data with each data element labeled as cyberattack data or as normal data, each data element further having a plurality of metrics associated therewith, and each data element labeled as cyberattack data further being associated with a particular type of cyberattack;
    identifying metrics associated with packet capture data elements that are indicative of either normal data or cyberattack data associated with a particular type of cyberattack for each particular type of cyberattack;
    computing statistical measures based on the identified metrics in the training set of packet capture data that relate to either normal data or cyberattack data for each particular type of cyberattack;

determining if linearization in necessary based on the computed statistical measures;

linearizing the identified metrics in the training set of packet capture data to obtain linearized training data wherein linearizing the identified metrics comprises taking a logarithm of the identified metrics to produce an identified metric logarithm for each identified metric;

training a plurality of machine learning networks with each network being associated with one particular type of cyberattack utilizing the linearized training data to classify packet capture data as either normal data or cyberattack data associated with the particular type of cyberattack;

intercepting real packet capture data from the network being monitored, said intercepted real packet capture data having real metrics for the same parameters as the identified metrics;

linearizing the real metrics from the intercepted real packet capture data to obtain linearized real data wherein linearizing the real metrics comprises taking a logarithm of the real metrics to produce a real metric logarithm for each real metric;

utilizing the plurality of trained machine learning networks to identify normal data and cyberattack data associated with one particular type of cyberattack from the linearized real data;

analyzing the results from the plurality of trained machine learning networks to determine whether the linearized real data represents normal data or cyberattack data associated with a particular cyberattack; and alerting a user if the trained machine learning network identifies cyberattack data in the linearized real data.

11. The method of claim 10, further comprising taking specific actions on the network being monitored in response to the association of cyberattack data with a particular cyberattack.

12. The method of claim 10, wherein the plurality of machine learning networks are tree-based machine learning networks.

13. The method of claim 10, wherein the provided training set is selected to have selected metrics that have computed statistical measures for normal data that are similar within a statistical tolerance to real packet capture data from the network being monitored.

14. The method of claim 10, wherein the provided training set is created from real packet capture data labeled as normal data and added cyberattack data labeled as cyberattack data.

15. The method of claim 10 wherein a correction factor is added to the identified metric and to the real metric before taking the logarithm.

* * * * *